(12) United States Patent
Ma

(10) Patent No.: US 9,957,865 B2
(45) Date of Patent: May 1, 2018

(54) METHOD OF FORCIBLY REGENERATING GASOLINE PARTICULATE FILTER

(71) Applicant: HYUNDAI MOTOR COMPANY, Seoul (KR)

(72) Inventor: Sang Jin Ma, Bucheon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 10 days.

(21) Appl. No.: 15/282,140

(22) Filed: Sep. 30, 2016

(65) Prior Publication Data
US 2017/0159522 A1 Jun. 8, 2017

(30) Foreign Application Priority Data
Dec. 7, 2015 (KR) .................. 10-2015-0173220

(51) Int. Cl.
| | |
|---|---|
| *F01N 3/00* | (2006.01) |
| *F01N 3/02* | (2006.01) |
| *F01N 3/20* | (2006.01) |
| *F02D 41/06* | (2006.01) |
| *F01N 3/18* | (2006.01) |
| *F02D 41/02* | (2006.01) |

(Continued)

(52) U.S. Cl.
CPC ............ *F01N 3/18* (2013.01); *F01N 9/002* (2013.01); *F02D 41/029* (2013.01); *F02D 41/08* (2013.01); *F01N 2430/06* (2013.01); *F01N 2900/0422* (2013.01); *F02D 41/064* (2013.01); *F02D 41/1475* (2013.01); *F02D 2200/021* (2013.01); *F02D 2200/0812* (2013.01); *F02D 2250/34* (2013.01); *Y02T 10/47* (2013.01)

(58) Field of Classification Search
CPC ........ F01N 3/18; F01N 9/002; F01N 2430/06; F01N 2900/0422; F02D 41/029; F02D 41/08; F02D 2200/021; F02D 2200/0812; F02D 41/064; F02D 41/1475; Y02T 10/47
USPC ................................. 60/286, 295, 277, 274
See application file for complete search history.

(56) References Cited

U.S. PATENT DOCUMENTS

| | | | |
|---|---|---|---|
| 2010/0011750 A1 | 1/2010 | Onodera et al. | |
| 2012/0102917 A1* | 5/2012 | Gibson ............. | G01N 27/4067 60/273 |

(Continued)

FOREIGN PATENT DOCUMENTS

| | | |
|---|---|---|
| JP | 2012-031798 A | 2/2012 |
| JP | 2015-183607 A | 10/2015 |

(Continued)

*Primary Examiner* — Dapinder Singh
(74) *Attorney, Agent, or Firm* — McDermott Will & Emery LLP

(57) ABSTRACT

A method of forcibly regenerating a gasoline particulate filter (GPF) includes a first operation of starting an engine, a second operation of determining whether a coolant temperature in the on-state of the engine is equal to or lower than a predetermined temperature, a third operation of determining whether an idle state of the engine is maintained for a predetermined time or longer when the coolant temperature is equal to or lower than the predetermined temperature, and a fourth operation of switching a fuel injection to an air-fuel (A/F) lean injection and forcibly regenerating the GPF by performing the A/F lean injection when the idle state of the engine is maintained for the predetermined time or longer.

4 Claims, 2 Drawing Sheets

(51) Int. Cl.
*F01N 9/00* (2006.01)
*F02D 41/08* (2006.01)
*F02D 41/14* (2006.01)

(56) References Cited

U.S. PATENT DOCUMENTS

2012/0124977 A1    5/2012  Choe
2013/0061581 A1*   3/2013  Sekiguchi ........... F02D 41/0085
                                                        60/299
2013/0192212 A1*   8/2013  Umemoto ............. F01N 3/0842
                                                        60/285

FOREIGN PATENT DOCUMENTS

KR       10-0593249  B1    6/2006
KR    10-2012-0054314  A   5/2012
KR       10-1518888  B1    5/2015

* cited by examiner

METHOD OF FORCIBLY REGENERATING GASOLINE PARTICULATE FILTER

CROSS-REFERENCE TO RELATED APPLICATION

This application claims, under 35 U.S.C. § 119(a), the benefit of priority to Korean Patent Application No. 10-2015-0173220, filed on Dec. 7, 2015 with the Korean Intellectual Property Office, the entire contents of which are incorporated herein by reference.

TECHNICAL FIELD

The present disclosure relates to a method of forcibly regenerating a gasoline particulate filter (GPF). More particularly, the present disclosure relates to a method of forcibly regenerating a GPF which is capable of improving back pressure of the GPF by pushing ash attached on a wall surface of a filter to a rear side of the filter and removing the ash, which blocks the wall surface of the filter.

BACKGROUND

According to a recent trend of high output and high efficiency engines, an engine adopting a gasoline direct injection (GDI) method, which directly injects fuel into a cylinder, has been widely adopted.

A GDI engine and a TGDI engine, in which a turbocharger is applied to a GDI engine, have a problem in that particulate matter (PM) is produced due to an increase in an incomplete combustion section within a combustion chamber.

In order to solve the production of the PM, research and development, such as an application of a gasoline particulate filter (GPF) serving as an exhaust particulate filter used in a diesel engine, has been actively conducted.

The GPF commonly combusts soot with natural regeneration unlike a diesel filter, and a temperature of an operation is mostly 400° C. or higher, so that when the soot is filtered, the soot regeneration is immediately performed.

When the filter is checked after the completion of actual endurance of 160,000 KM, the amount of soot is very small (0.1 g) and the amount of ash is large (20 g).

Ash, which is a final product of the soot, is a main cause of an increase in back pressure when mileage is increased. In a case of the natural regeneration of the GPF, a phenomenon occurs in which the ash blocks a wall surface.

However, in a diesel filter, a temperature and pressure are sharply increased during the regeneration by forcible regeneration through post injection, so that the ash is accumulated at a rear side of the filter.

The absolute amount of soot of the diesel is large, so that the amount of ash is large compared to gasoline.

Accordingly, in a case of the GPF, a back pressure is increased due to the ash stacked on the wall surface of the filter, and as a result, an output deteriorates and the amount of fuel consumed is increased.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

An object of the present disclosure is to provide a method of forcibly regenerating a gasoline particulate filter (GPF), which implements a new GPF back pressure reducing method of forcibly regenerating the GPF by a method of forcibly pushing ash blocking a wall surface of a filter under a low temperature starting condition during the winter and an idle operation condition to a rear side of the filter, thereby improving the back pressure of the GPF, increasing an output, and decreasing the amount of fuel consumed.

In order to achieve the aforementioned object, a method for forcibly regenerating a GPF provided by the present disclosure has the following features.

In one aspect, the present disclosure provides a method of forcibly regenerating a gasoline particulate filter (GPF) that may include: a first operation of starting an engine; a second operation of determining whether a coolant temperature in the on-state of the engine is equal to or lower than a predetermined temperature; a third operation of determining whether an idle state of the engine is maintained for a predetermined time or longer when the coolant temperature is equal to or lower than the predetermined temperature; and a fourth operation of switching a fuel injection to an air-fuel (A/F) lean injection and forcibly regenerating the GPF by performing the A/F lean injection when the idle state of the engine is maintained for the predetermined time or longer.

In an embodiment, an operation of determining whether a mileage of a vehicle is equal to or larger than a predetermined mileage may be further performed in the second operation, and when the condition in which the mileage of the vehicle is equal to or larger than the predetermined mileage is satisfied, and/or a condition in which the coolant temperature is equal to or lower than the predetermined temperature is satisfied, the third operation may be performed.

In another embodiment, between the second operation and the third operation, a 2-1 operation of performing an A/F rich fuel injection may be performed when the coolant temperature is equal to or lower than the predetermined temperature, and then the third operation of determining whether the idle state of the engine is maintained for the predetermined time or longer during the A/F rich injection may be performed.

In still another embodiment, in the third operation, the predetermined time for determining the maintenance time of the idle state may be 20 seconds to 30 seconds.

According to the method for forcibly regenerating the GPF provided in the present disclosure, it is possible to improve a back pressure of the GPF by setting a condition of mileage, a coolant temperature, an idle time, and the like, forcibly regenerating the GPF, pushing the ash to a rear side of the filter, and removing the ash blocking a wall surface of the filter, thereby increasing an output of an engine and decreasing the amount of fuel consumed.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
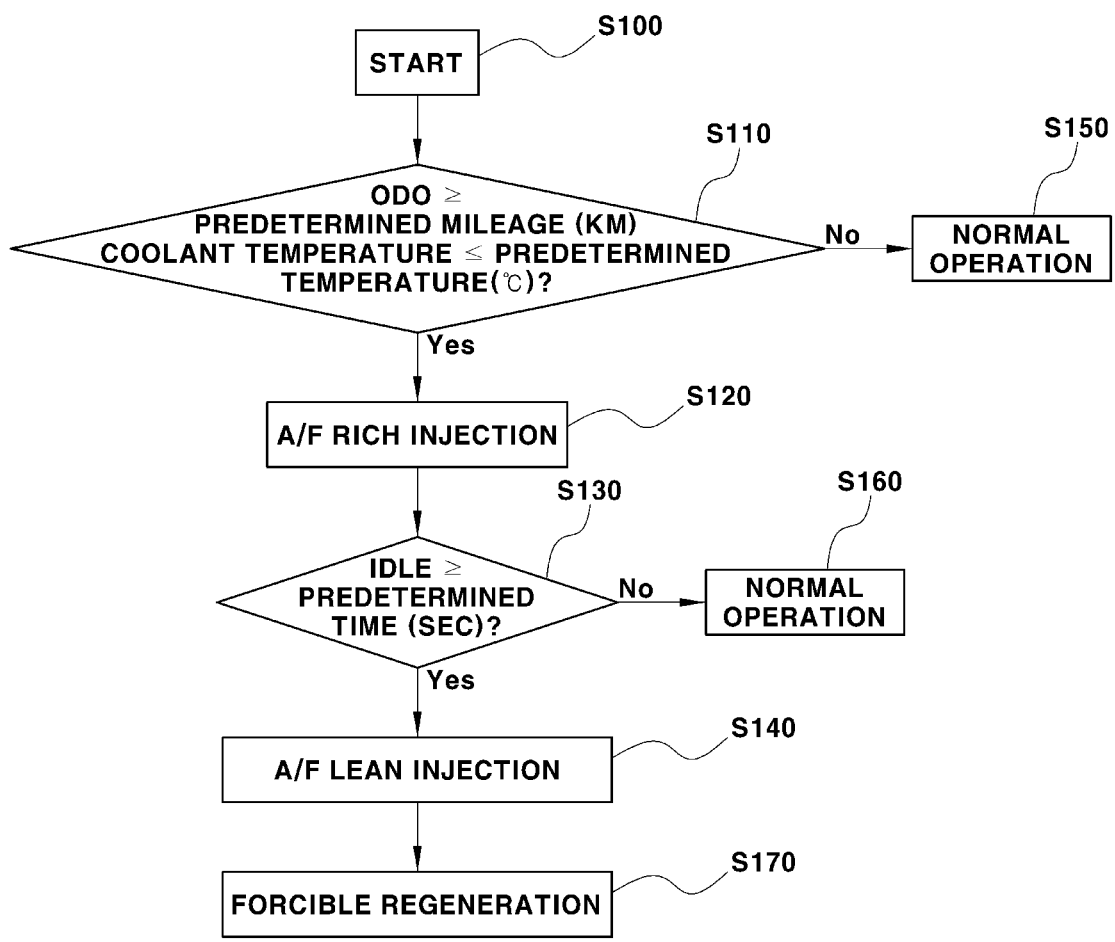
FIG. 1 is a flowchart illustrating a method of forcibly regenerating a gasoline particulate filter (GPF) according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, the present disclosure will be described in detail with reference to the accompanying drawings.

FIG. 1 is a flowchart illustrating a method of forcibly regenerating a gasoline particulate filter (GPF) according to an exemplary embodiment of the present disclosure.

As illustrated in FIG. 1, the method of forcibly regenerating the GPF is a method of improving a back pressure of a GPF by performing regeneration of forcibly depositing ash in an idle section when the engine starts at a low temperature (winter) of a coolant at a time at which a GPF-mounted vehicle including a GDI engine travels a predetermined mileage, for example, about 50,000 KM determined through a durability evaluation.

To this end, in a first operation, the engine first may start (S100).

Next, in a second operation, whether a coolant temperature is equal to or lower than a predetermined temperature in the on-state of the engine may be determined (S110).

Operation S110 is an operation of considering a temperature of the outside, and under a condition in which the temperature of the outside is low, such as a winter season, an increase in a temperature of the GPF is slow and a relatively large amount of soot may be deposited, and the regeneration may be forcibly performed in a state where the soot is forcibly deposited. That is, the regeneration may be forcibly performed after the forcible deposition of the soot is induced at a low temperature condition, thereby improving a regeneration effect.

In a case of a gasoline engine, since a temperature of exhaust gas is high, when the soot is filtered, the soot is immediately regenerated so that the soot is not deposited. Accordingly, it may be preferable to perform the forcible regeneration in a state where the large amount of soot deposited is secured by selecting a temperature condition as low as possible (to perform the forcible regeneration at a high pressure).

Here, the predetermined temperature of the coolant temperature may be set through several experiments, and may be set to 0° C. or lower in consideration of a case where an outside temperature in a winter season is below zero temperature, and may be set in consideration of the lowest outside temperature in a corresponding region in a case of a hot area.

In the second operation, a process of considering a mileage of the vehicle may be further performed as the condition for the forcible regeneration.

For example, a process of determining whether a mileage of the vehicle is equal to or larger than a predetermined mileage may be performed.

In this case, the predetermined mileage may be determined based on data of the amount of ash deposited on a wall surface of the filter obtained through various calibrations after the durability evaluation of the vehicle, and about 50,000 KM may be determined as the predetermined mileage.

That is, the forcible regeneration of the GPF may be performed according to a 50,000 KM cycle.

Here, when the condition where the mileage of the vehicle is equal to or larger than the predetermined mileage is satisfied, and the condition where the coolant temperature is equal to or lower than the predetermined temperature is satisfied, or when the condition where the mileage of the vehicle is equal to or larger than the predetermined mileage is satisfied, or when the condition where the coolant temperature is equal to or lower than the predetermined temperature is satisfied, a next operation, that is, a 2-1 operation or a third operation may be performed.

When the condition in which the mileage of the vehicle is equal to or larger than the predetermined mileage is not satisfied and the condition in which the coolant temperature is equal to or lower than the predetermined temperature is not satisfied (the mileage of the vehicle is smaller than the predetermined mileage and the coolant temperature is higher than the predetermined temperature), the condition where the mileage of the vehicle is equal to or larger than the predetermined mileage is not satisfied, or the condition in which the coolant temperature is equal to or lower than the predetermined temperature is not satisfied, the forcible regeneration of the GPF may not be performed, and the vehicle may be normally operated (S150).

Next, in the 2-1 operation, when the coolant temperature is equal to or lower than the predetermined temperature (and/or the mileage of the vehicle is equal to or larger than the predetermined mileage), an A/F rich injection may be performed.

Here, the A/F may mean a ratio of fuel to air (air-fuel ratio), and the A/F rich injection may mean that an air-fuel ratio is relatively large (the amount of fuel is large compared to the amount of air) compared to a general theoretical air-fuel ratio, and an A/F lean injection to be described below may mean that an air-fuel ratio is relatively small (the amount of fuel is small compared to the amount of air) compared to a general theoretical air-fuel ratio.

That is, in this operation, the large amount of fuel is supplied compared to the theoretical air-fuel ratio, so that the forcible generation of the incomplete combusted soot may be induced and thus the large amount of soot may be deposited, and as a result, a state where the large amount of soot is deposited within the GPF may be created.

If the A/F rich injection control method, the A/F lean injection control method, and the like are generally known in the art, the methods may be adopted without a particular limitation, and each operation performed in the present disclosure may be controlled by a controller, such as an electronic control unit (ECU).

The A/F rich injection in this case may be performed in an idle state of the engine, and may be performed for a predetermined time of the idle state of the engine to be described below.

Next, in a third operation, whether the state of the engine idle is maintained for a predetermined time or longer may be determined (S130).

That is, a certain degree of soot on the filter is deposited by maintaining the idle state, in which the A/F rich injection may be performed, for a predetermined time.

Here, the predetermined time of the idle state of the engine may be a time for which the soot is forcibly deposited.

That is, the predetermined amount of soot may be deposited according to the A/F rich injection for the predetermined time, in which the idle state of the engine is maintained.

The predetermined time may be determined through the several times of calibration, such as a detection of the amount of soot deposited or a soot deposition state, by performing the A/F rich injection when the engine starts at a low temperature, and may be set within a range of 10 seconds to 1 minute, preferably, a range of 20 seconds to 30 seconds.

Here, when a driver performs an operation, such as starting the vehicle, before the idle state of the engine does not exceed the predetermined time, the forcible regeneration of the GPF may not be performed and the vehicle may be normally operated (S160).

Next, in a fourth operation, when the maintenance time of the idle state is equal to or larger than the predetermined time, the A/F rich injection may be switched to the A/F lean injection, and then the forcible regeneration of the GPF may be performed by performing the A/F lean injection (S140 and S170).

That is, when the maintenance time of the idle state exceeds the predetermined time, the A/F rich injection may be switched to the A/F lean injection, and in this operation, the forcible regeneration of the GPF may be performed by combusting the soot by supplying the large amount of air compared to the theoretical air-fuel ratio to the GPF (sufficiently supplying oxygen to the GPF), and as a result, during the process of the forcible regeneration, the ash blocking the wall surface of the filter may be separated, pushed to the rear side of the filter, and deposited.

The time of the forcible regeneration of the GPF through the A/F lean injection may be appropriately set through experimentation for each engine and each vehicle.

Figure 2:
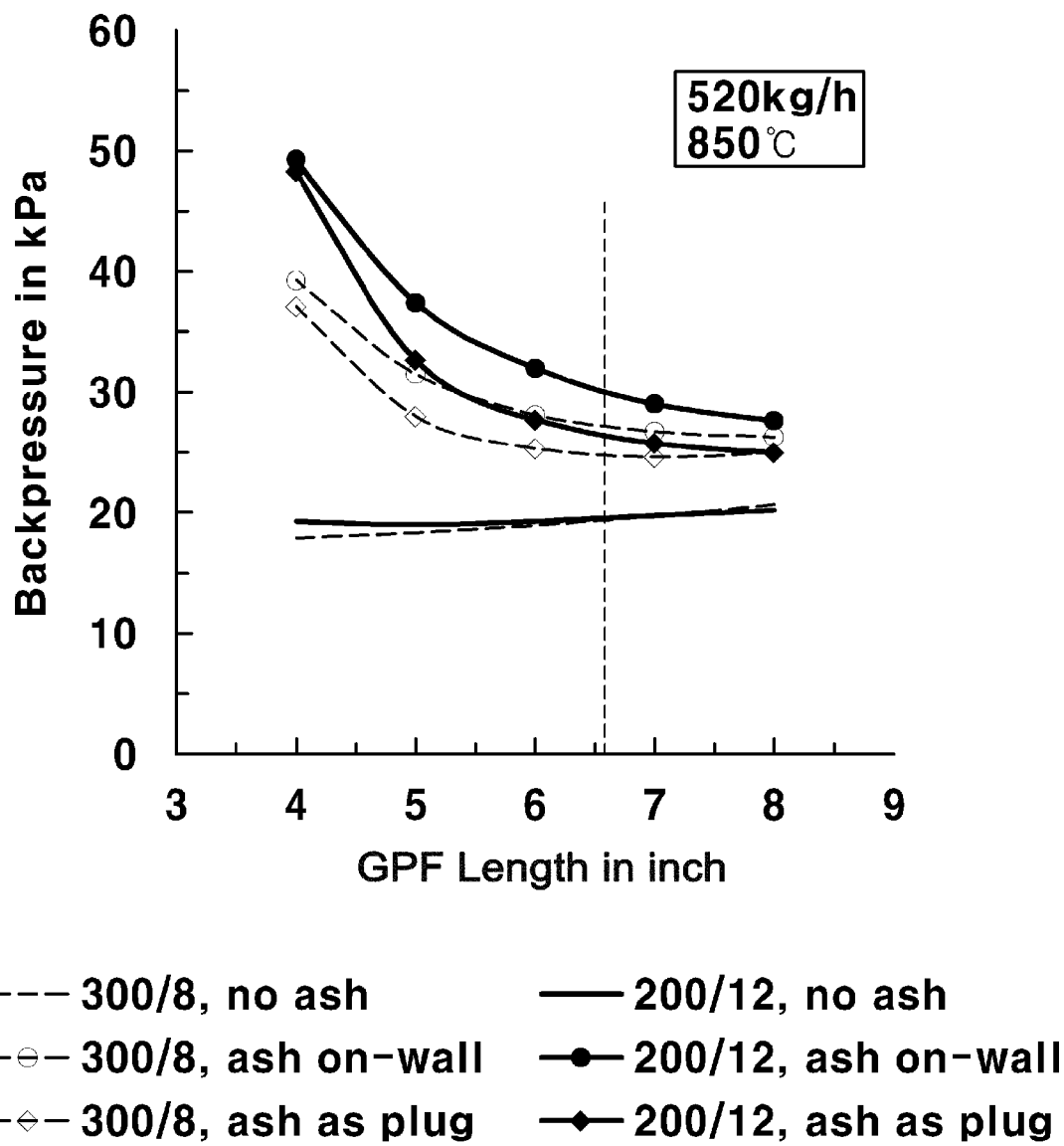
FIG. 2 is a graph illustrating a GPF back pressure reduction effect according to a method of forcibly regenerating the GPF according to an exemplary embodiment of the present disclosure.

FIG. 2 is a graph illustrating a GPF back pressure reduction effect according to a method of forcibly regenerating the GPF according to an exemplary embodiment of the present disclosure. It can be seen that a back pressure after the forcible regeneration of the GPF (a graph with a thin dotted line) may be improved (improved about 5 kPa) compared to before the forcible regeneration of the GPF (a graph with a thick solid line).

By improving the back pressure through the forcible regeneration of the GPF, it is possible to decrease a length of the GPF, thereby achieving an effect of cost reduction.

For example, a length, 6.5 inches, of the existing GPF may be decreased to 5.5 inches (25.4 mm), and when a length of 0132 is decreased to 25.4 mm, a volume is decreased by 0.35 L, thereby achieving the cost reduction to about 10,000 won/one.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of forcibly regenerating a gasoline particulate filter (GPF), comprising:
    a first operation of starting an engine;
    a second operation of determining whether a coolant temperature in the on-state of the engine is equal to or lower than a predetermined temperature;
    a third operation of determining whether an idle state of the engine is maintained for a predetermined time or longer when the coolant temperature is equal to or lower than the predetermined temperature; and
    a fourth operation of switching a fuel injection to an air-fuel (A/F) lean injection and forcibly regenerating the GPF by performing the A/F lean injection when the idle state of the engine is maintained for the predetermined time or longer.

2. The method of claim 1, wherein an operation of determining whether a mileage of a vehicle is equal to or larger than a predetermined mileage is performed during the second operation, and when the condition in which the mileage of the vehicle is equal to or larger than the predetermined mileage is satisfied, and/or when a condition in which the coolant temperature is equal to or lower than the predetermined temperature is satisfied, the third operation is performed.

3. The method of claim 1, wherein between the second operation and the third operation, a 2-1 operation of performing an A/F rich fuel injection is further performed when the coolant temperature is equal to or lower than the predetermined temperature, and then the third operation of determining whether the idle state of the engine is maintained for the predetermined time or longer during the A/F rich injection is performed.

4. The method of claim 1, wherein in the third operation, the predetermined time for determining the maintenance time of the idle state is 20 seconds to 30 seconds.

* * * * *